(12) United States Patent
Zimmerman et al.

(10) Patent No.: US 8,083,373 B2
(45) Date of Patent: Dec. 27, 2011

(54) LED RETROFIT FOR FLUORESCENT BACKLIT SIGNS

(76) Inventors: James William Zimmerman, Diamond Bar, CA (US); Jimmy Myer, Riverside, CA (US); William Raymond Sanford, Riverside, CA (US)

(*) Notice: Subject to any disclaimer, the term of this patent is extended or adjusted under 35 U.S.C. 154(b) by 0 days.

(21) Appl. No.: 12/460,661

(22) Filed: Jul. 23, 2009

(65) Prior Publication Data

US 2011/0019413 A1 Jan. 27, 2011

(51) Int. Cl.
*F21S 4/00* (2006.01)
(52) U.S. Cl. .......... 362/249.02; 362/800; 362/253; 362/217.01; 362/221; 362/227
(58) Field of Classification Search .......... 362/249.02, 362/249.03, 800, 227, 228, 234, 217.01, 362/221, 253
See application file for complete search history.

(56) References Cited

U.S. PATENT DOCUMENTS

| | | | | |
|---|---|---|---|---|
| 7,441,922 B2* | 10/2008 | Huang et al. | ............... | 362/235 |
| 7,482,761 B2* | 1/2009 | Yang | ............... | 315/185 R |
| 7,488,086 B2* | 2/2009 | Wu et al. | ............... | 362/225 |
| 7,556,396 B2* | 7/2009 | Kuo et al. | ............... | 362/217.01 |
| 7,594,738 B1* | 9/2009 | Lin et al. | ............... | 362/249.02 |
| 7,611,260 B1* | 11/2009 | Lin et al. | ............... | 362/224 |
| 7,635,201 B2* | 12/2009 | Deng | ............... | 362/249.02 |
| 7,670,040 B2* | 3/2010 | Park | ............... | 362/612 |
| 2009/0091929 A1* | 4/2009 | Faubion | ............... | 362/234 |
| 2010/0124007 A1* | 5/2010 | Yamamoto et al. | ............... | 361/679.08 |
| 2010/0232154 A1* | 9/2010 | Chen | ............... | 362/235 |

\* cited by examiner

*Primary Examiner* — Anabel Ton

(57) ABSTRACT

The present invention relates to an LED assembly designed to supplant fluorescent tubes, comprising: an array of standardized LED modules affixed to a lightweight frame resulting in a uniform two dimensional array of LEDs casting their light directly onto a translucent sign panel or, alternatively, a light defusing panel for area lighting. When the application is to retrofit a fixture with fluorescent tubes, the assembly is provided with adapters that attach to the fluorescent tube receptacles.

10 Claims, 3 Drawing Sheets

LED RETROFIT FOR FLUORESCENT BACKLIT SIGNS

FIELD OF THE INVENTION

The present invention generally relates to a means of easily replacing the fluorescent lighting in backlit signs with longer lasting, lower maintenance, more power efficient light emitting diode modules.

BACKGROUND OF THE INVENTION

Fluorescent backlit street signs have become the street sign of choice at critical intersections around the world. They make it very easy to identify street names at night, which reduces the level of distraction experienced by drivers unfamiliar with the location. This makes for safer intersections. The downside of these signs with fluorescent lights is they must be replaced approximately every eight months. The cost of the fluorescent tubes themselves is not too great, but the cost of the crew and equipment to perform the maintenance adds up. It is also a nuisance to properly dispose of the spent fluorescent bulbs.

It has been recognized that Light Emitting Diodes (LEDs) have the obvious advantage of having a much longer mean life between failure than do fluorescent bulbs. In many applications they also use significantly less power and are easier to dispose of. Others have already designed LED based products to replace fluorescent bulbs in backlit street signs. The current invention is proposed as an improvement that is achieved by different means. It provides better, more even lighting, is easier to install, and less costly to manufacture.

U.S. Pat. No. 6,761,471 issued on Jul. 13, 2004 discloses an LED assembly comprising an adjustable scissor mechanism employing principles of pressure and friction to secure the assembly. Also disclosed is the use of lenses as a means achieve an even distribution of light, as well as an alternative framework to achieve the same without the use of lenses.

U.S. Pat. No. 7,303,309 issued on Dec. 4, 2007 discloses a backlit sign comprising a housing with translucent, angled sidewalls and LED modules with lenses mounted to the top housing wall providing means to focus light on the sidewalls. Also disclosed is the use of a mirror on the bottom wall of the housing to further enhance the uniformity of lighting on the sidewalls.

U.S. Pat. No. 7,488,086 issued on Feb. 10, 2009, discloses an assembly comprising a linear LED array terminated at either end with electrical connectors compatible with fluorescent tube receptacle. A mirror reflector can be mounted on an opposing wall to distribute the light a little more evenly. Further disclosed is that the cross section of the assembly can be different shapes, but still resulting in an essentially one dimensional array intended to duplicate the light emitting characteristics of a fluorescent tube.

U.S. patent application Ser. No. 11/411,674 filed on Apr. 26, 2006, discloses a contoured mounting device for LEDs of one or more colors so as to best match the illumination requirements of a sign.

U.S. Pat. No. 6,853,151 issued on Feb. 8, 2005 and U.S. Pat. No. 6,762,562 issued on Jul. 13, 2004 disclose a basically tubular LED assembly that mechanically and electrically installs in the same manner as the fluorescent tube it is designed to replace. It comprises the necessary electronics to convert the electrical power supplied by the fluorescent ballast to meet the needs of the LED assembly.

U.S. Pat. No. 6,739,734 issued on May 25, 2004 discloses an assembly comprised of a basically flat sheet of relatively stiff material with LED modules affixed to it. Also disclosed is that the LED assembly and power supply are mounted independently to the housing by undisclosed means.

U.S. Pat. No. 6,936,968 issued on Aug. 30, 2005 discloses an LED assembly within a clear cylindrical enclosure. There is a means on either end of the assembly to install into a fluorescent tube receptacle and make electrical contact. There is no claim of using power from the fluorescent ballast.

U.S. Pat. No. 6,924,973 issued on Aug. 2, 2005 discloses an LED module suitable for backlighting signs, the module comprising means to provide protection from hostel environments and to convert AC line current to power the LED.

None of the prior art discloses an LED assembly comprising LED modules; said modules comprised of a PCB assembly; said PCB assembly comprised of a long slender PCB, a linear array of LEDs along its length, current conditioning electronics, a means of attachment to the assembly, and a coating to protect against environmental conditions such as humidity; said LED modules themselves being arranged in a linear array on a simple, lightweight structural frame, resulting in a uniform two dimensional array of LEDS ideally suited to providing either direct uniform area lighting or direct uniform backlighting of translucent signs. Furthermore, none of the prior art discloses, in the instance of retrofitting fluorescent tubes with an LED assembly, the use of the fluorescent receptacles solely as a mechanical means of attachment, completely abandoning their electrical function. Still furthermore, none of the prior art discloses the use of commercially available, environmentally sealed, high efficiency, switching power supplies mounted to either the lightweight frame of the LED assembly or the housing of the fixture.

In accordance with the present invention there is provided a low-cost, environmentally hardened, reliable LED assembly designed and configured provide uniform lighting and trouble-free use in applications requiring minimal maintenance and maximum lifetime. Furthermore, the simplicity of design makes the assembly extremely easy to install whether being put directly into an OEM fixture, or being used to retrofit an existing fluorescent fixture.

SUMMARY OF THE INVENTION

In general, it is an object of the present invention to provide the simplest, most reliable LED assembly possible to take the place of fluorescent tube lighting, whether in OEM or retrofit applications. Others have attempted to make LED assemblies that can directly replace fluorescent tubes. This results in a more complex assembly with more components, more expensive components, and lower efficiency.

Rather than attempt to duplicate the fluorescent tube, the current invention attempts to improve on the utility that the fluorescent tube provides while using to advantage the unique characteristics of the LED. In this instance it means making the lighting system as direct possible. Indirect lighting, use of reflectors, lenses, and light pipes can all lead to loss of efficiency relative to direct lighting and should only be used if unavoidable, they result in simpler design, or they result in a unique desirable effect. In this case they are avoidable, they result in a more complex design, and they have a less desirable effect.

This invention uses the simplest of frames on which to hang standardized LED modules which consist entirely of the simplest form of electrical assembly, the PCB assembly. While using minimal materials, a two dimensional array of LEDs results in very direct and even lighting being directed onto translucent sign panel or, alternatively, light defusing panel for area lighting.

It is fortunate that there are commercially available environmentally hardened switching power supplies which are very efficient. The current invention utilizes one of these to power the entire array of LED modules, which are daisy-chained to each other via the power cord. In the case of fluorescent tube retrofit applications, the fluorescent ballast is abandoned. Depending on the application, the switching power supply can be mounted to the lightweight frame of the LED assembly, or to the fixture housing. The switching power supply is selected to use whatever the AC line power is most accessible. Battery power supplies could be utilized as well, and the batteries could be recharged from solar panels.

The current invention can be used in OEM applications as well a retrofit applications. In the case of retrofit applications, simple adapters mounted to the lightweight frame provide a quick and easy way to install the assembly using the existing fluorescent tubes receptacles. This is strictly a mechanical connection. No attempt is made to connect electrically through the fluorescent tube receptacles.

BRIEF DESCRIPTION OF THE DRAWINGS

Additional objects and features of the present invention will become more apparent and the invention itself will be best understood from the following Detailed Description of Exemplary Embodiments, when read with reference to the accompanying drawings.

DETAILED DESCRIPTION OF THE PREFERRED EMBODIMENTS

The following detailed description is of the best presently contemplated modes of carrying out the invention. This description is not to be taken in a limiting sense, but is made merely for the purposes of illustrating general principles of embodiments of the invention.

Figure 1:
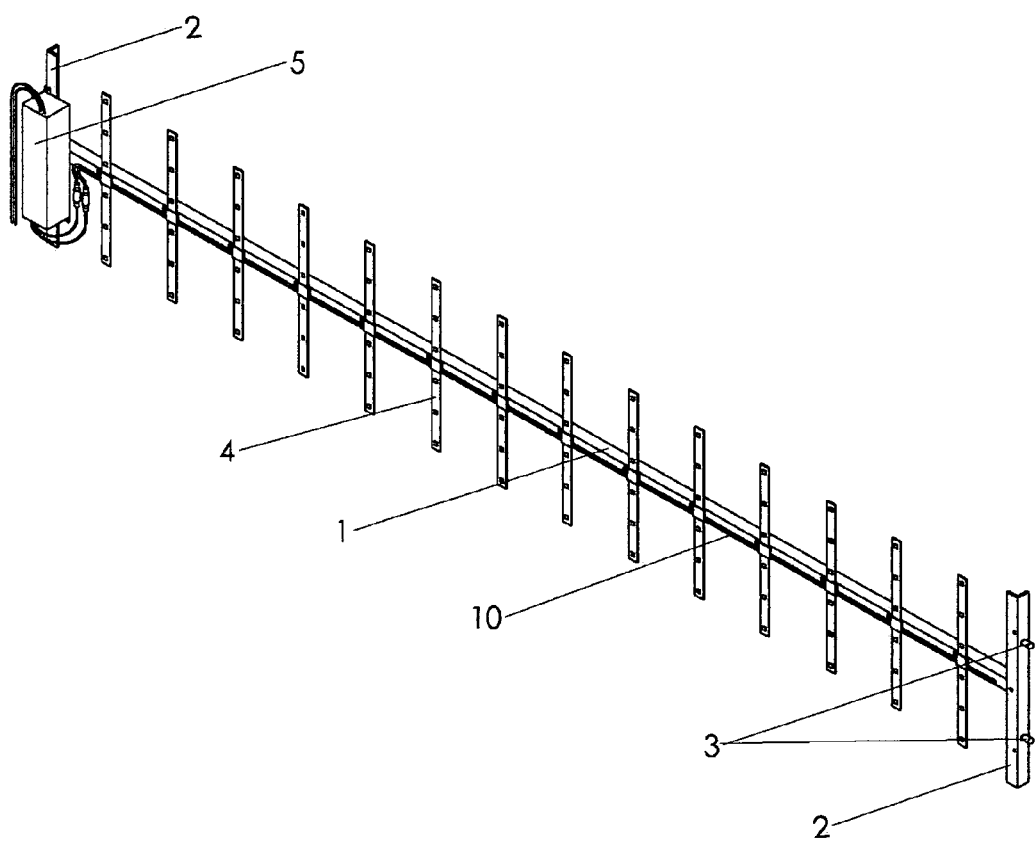
FIG. 1 shows a typical LED retrofit assembly designed according to the principles of the present invention.
Figure 3:
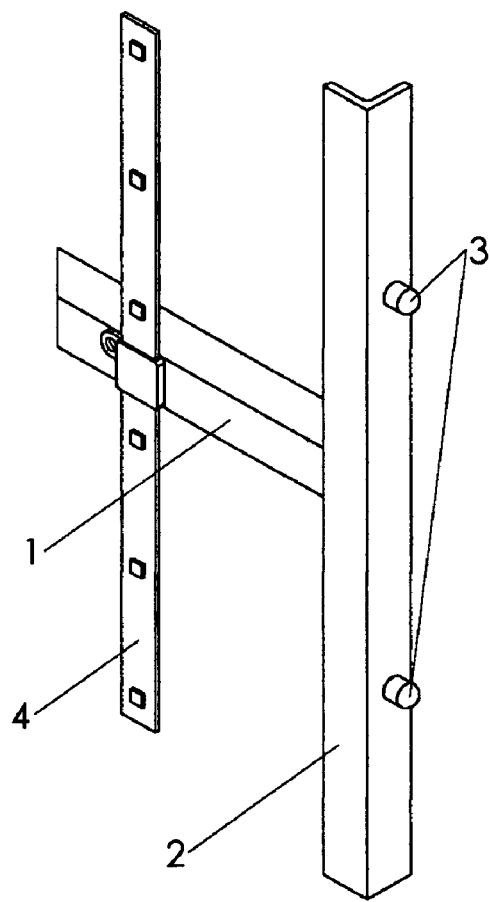
FIG. 3 shows the interface configuration for single pin base fluorescent tube fixtures.

FIG. 1 shows assembly typifying an embodiment of the invention tailored to replace two single pin base fluorescent tubes with LED lighting. The frame consists of a long length of extruded aluminum angle 1 to the ends of which are attached two short lengths of extruded aluminum angle 2 using a single fastener such as a pop rivet for each. FIG. 3 shows in greater detail the short length of extruded aluminum angle 2 into which is pressed the single pin base fluorescent tube adapter 3. The entire assembly is pressed into the two sets of fluorescent tube receptacles simultaneously in a manner similar to which the fluorescent tubes are installed. The assembly is now mechanically secured into the fixture. The adapter 3 is made of electrically insulating material to guard against the possibility that power has not yet been disconnected from the fluorescent ballast as advised. The fluorescent ballast generally will not be in the way and need not be removed, but power should be disconnected from the fluorescent ballast to conserve energy.

Figure 2:
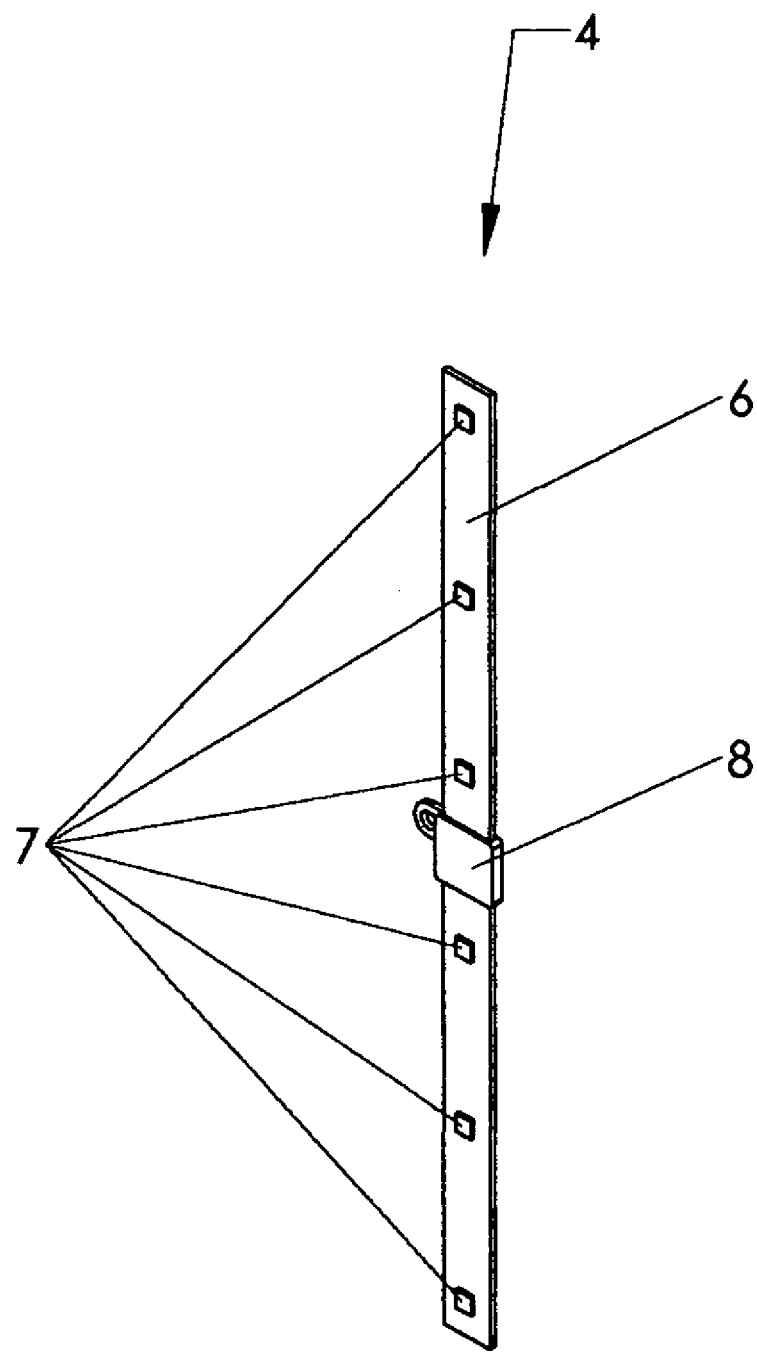
FIG. 2 shows a typical PCB assembly that comprises an example of an LED module.

In FIG. 1 can be seen an array of LED modules 4 affixed to the frame member 1. The LED module 4 is shown in more detail in FIG. 2. The LED module consists of a long slender PCB 6 onto which a linear array of LEDs 7 is assembled. Also affixed to the PCB 6 is a means 8 by which the LED module 4 can be secured to the frame member 1 with a single fastener. As can be seen in FIG. 1, the LEDs 7, as identified in FIG. 2, are arranged in a regular two dimensional array which is ideal for evenly illuminating an adjacent translucent sign panel. The LEDs 7 may be assembled onto both sides of the PCB 6 if there sign panels adjacent to both sides.

The assembly in FIG. 1 also shows a commercially available switching power supply 5 attached to the frame. The switching power supplies 5 are available in environmentally hardened and extremely efficient models. The LED modules 4 are manufactured with a power cord 10 daisy-chaining them together. The output from the power supply 5 attaches to one of the two power cords of the nearest LED module. Once the assembly is installed into the fixture, the input the power supply 5 is attached AC power line that formerly powered the fluorescent ballast. The installation of the LED assembly is now complete.

Figure 4:
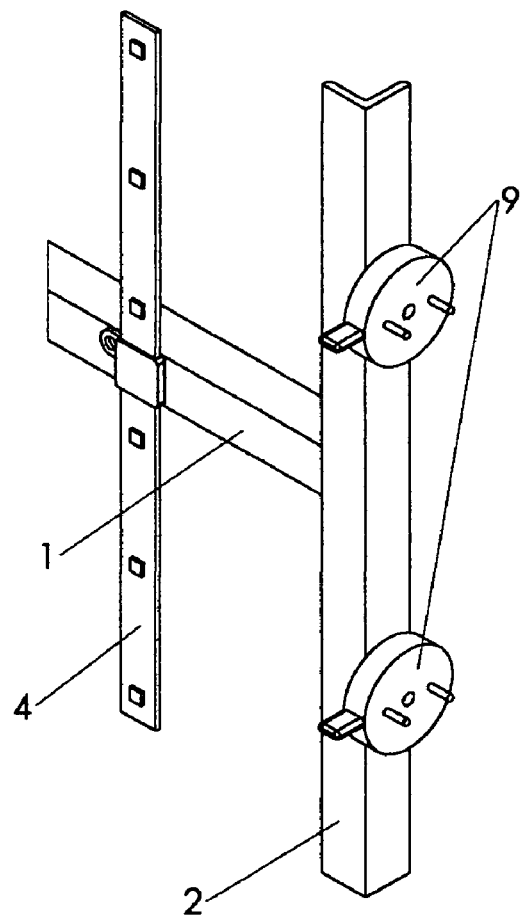
FIG. 4 shows the interface configuration for bi-pin base fluorescent tube fixtures.

FIG. 4 shows one embodiment of a bi-pin base fluorescent tube receptacle adapter 6. The adapter is designed to slide into the receptacle and then be rotated using the thumb lever to lock it in place.

In other embodiments the LED assembly could be configured differently. For OEM applications the fluorescent tube receptacle adapters would not be part of the assembly, which would be mounted directly to the fixture housing. It might be preferable to have the one power supply for a number of assemblies, in which case it would be attached to just one of the assemblies or directly to the fixture housing. Generally, the assemblies are no heavier than the fluorescent tubes they supplant.

From the foregoing description, it should now be appreciated that a novel and unobvious LED assembly for supplanting fluorescent tubes has been disclosed for a variety of applications. While the invention has been described with reference to a specific embodiment, the description is illustrative of the invention and is not to be construed as limiting the invention. Various modifications and applications may occur to those who are skilled in the art, without departing from the true spirit and scope of the invention.

What is claimed is:

1. An assembly to supplant fluorescent lighting in backlit signs or area lighting with a two dimensional array of LEDs comprising:
    a frame including an elongated support member and a plurality of angled members arranged transverse to the elongated support member at opposite ends there from;
    a plurality of adapters provided on each on of the plurality of angled members and configured to be received by conventional fluorescent lamp receptacles;
    an LED assembly including a plurality of LED modules having a printed circuit board, at least one LED array including a plurality of light emitting diodes on a surface of the printed circuit board, and current conditioning circuitry;
    wherein the LED modules are mounted parallel to and spaced from each other on at least one side surface of the elongated support member;
    a power source attached to the frame at one of the opposite ends of the elongated support member;
    at least one power cord, the LED modules being daisy-chained together by the power cord.

2. The assembly of claim 1, wherein the said plurality of adapters is for single pin base fluorescent tube receptacles.

3. The assembly of claim 1, wherein the said plurality of adapters is for bi-pin base fluorescent tube receptacles.

4. The replacement assembly of claim 1, wherein the PCB assembly has LEDs mounted to only one side so as to create a two dimensional array of light sources for evenly backlighting a translucent sign or for providing area lighting.

5. The replacement assembly of claim 1, wherein the PCB assembly has LEDs mounted to both sides so as to create a two dimensional array of light sources for simultaneously evenly backlighting translucent signs on both sides of the assembly.

6. A method of configuring to supplant fluorescent lamps in backlit signs or area lights, the method comprising:
    providing a frame including an elongated support member and a plurality of angled members arranged transverse to the elongated support member at opposite ends there from;
    a plurality of adapters provided on each on of the plurality of angled members and configured to be received by conventional fluorescent lamp receptacles;
    an LED assembly including a plurality of LED modules having a printed circuit board, at least one LED array including a plurality of light emitting diodes on a surface of the printed circuit board, and current conditioning circuitry;
    wherein the LED modules are mounted parallel to and spaced from each other on at least one side surface of the elongated support member;
    a power source attached to the frame at one of the opposite ends of the elongated support member;
    at least one power cord, the LED modules being daisy-chained together by the power cord.

7. The assembly of claim 6, wherein the said plurality of adapters is for single pin base fluorescent receptacles.

8. The assembly of claim 6, wherein the said plurality of adapters is for bi-pin base fluorescent receptacles.

9. The method according to claim 6, wherein said LED modules have LEDs on a single side.

10. The method according to claim 6, wherein said LED modules have LEDs on both sides.

\* \* \* \* \*